Aug. 11, 1931.     P. W. STEPHENS     1,818,284
DETACHABLE HANDLE FOR COOKING UTENSILS
Filed Jan. 12, 1929
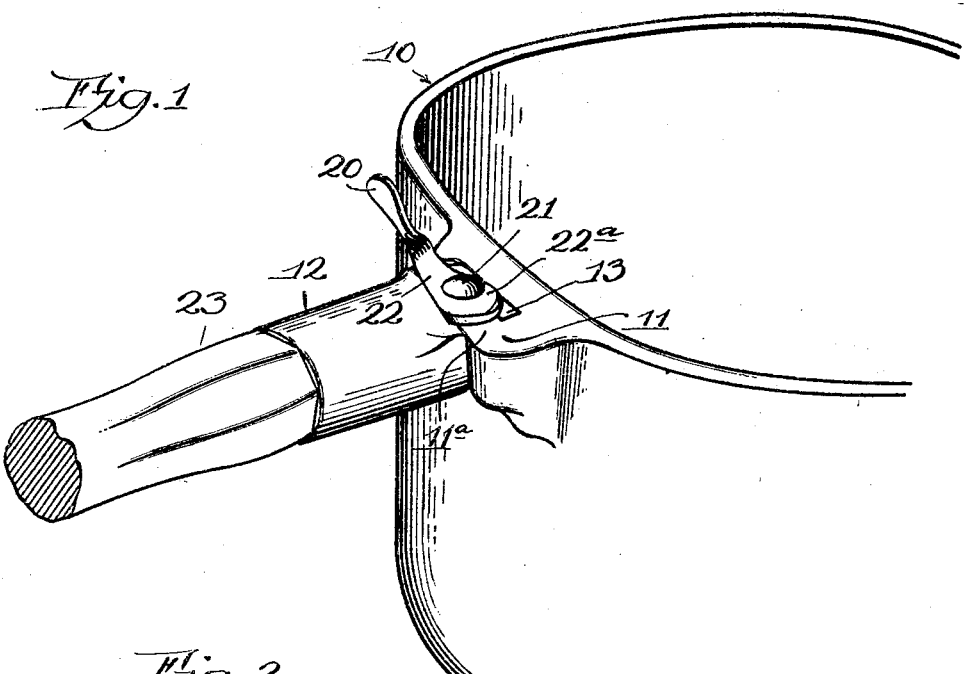
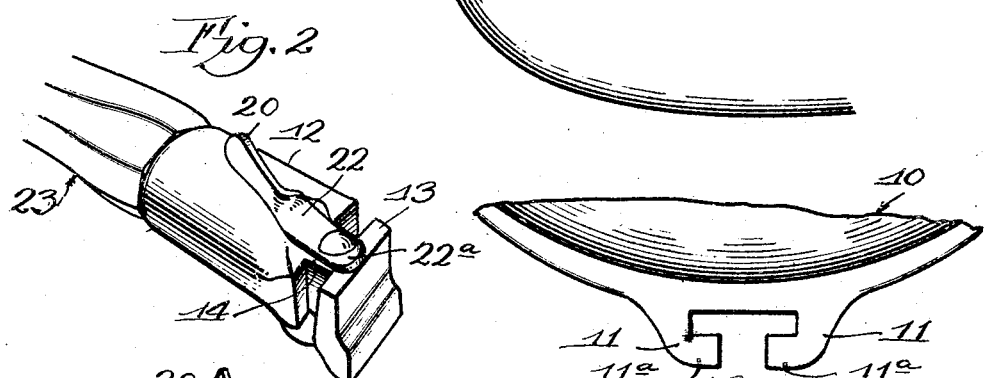
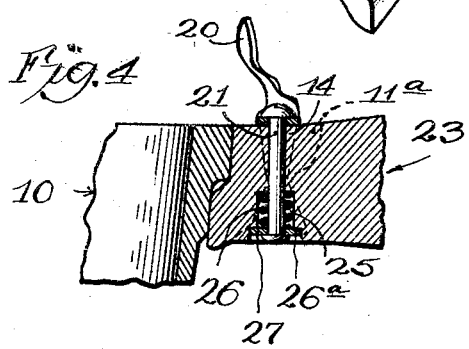
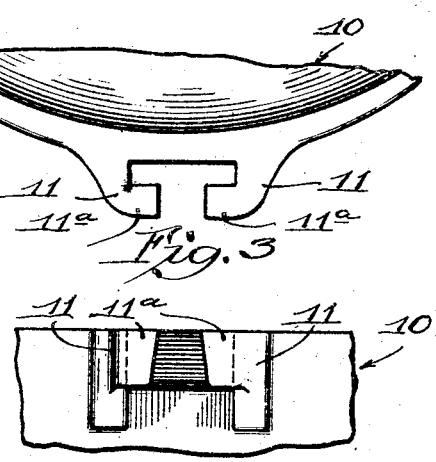
Inventor,
Percy W. Stephens Patented Aug. 11, 1931

1,818,284

UNITED STATES PATENT OFFICE

PERCY W. STEPHENS, OF CHICAGO, ILLINOIS

DETACHABLE HANDLE FOR COOKING UTENSILS

Application filed January 12, 1929. Serial No. 331,986.

This invention relates to improvements in means for securing detachable handles to vessels, such as cooking utensils or the like, in which the vessel has a lug at one side provided with an upwardly tapered socket in which the handle is detachably fitted.

The principal object of the present invention is to provide a simple and easily manipulated securing device to hold the handle in place in its socket, and thus permit the utensil to be tipped sidewise or upside down, as desired, without danger of displacing the socket connection and consequent dropping of the utensil from its handle.

The invention may best be understood by reference to the accompanying drawings, in which Figure 1 is a perspective view of a cooking vessel to which my improved invention is applied.

Figure 2 is a detail view of the handle and its securing handle in unlocked position.

Figure 3 is a fragmentary plan view of the vessel, showing the securing lugs.

Figure 4 is a vertical section taken longitudinally through the handle and vessel when in locked position, and Figure 5 is a side view of the parts shown in Figure 3.

Referring more particularly to details of the invention as embodied in the drawings, 10 indicates a cooking utensil having a pair of spaced lugs 11, 11 forming an upwardly tapered socket member of the type often employed in devices of this character. As herein shown the socket is generally rectangular in horizontal section, but its shape may vary widely, as desired. A detachable handle 12 is provided with an enlarged end portion 13 adapted to fit in said socket by insertion from the under side of the lugs 11, 11, and with a connecting neck portion 14 extending between the outer ends 11a, 11a of the lugs 11, 11.

Referring now more particularly to the securing means which forms the subject matter of my invention, I provide a lever 20 pivotally mounted on the top of the handle 12 adjacent the lugs 11, 11 and arranged so that portions of the lever may be moved into and out of engagement with the top of said lugs at will.

In the preferred form shown, said lever is mounted on a pivot pin 21 extending vertically through the neck 14. The lever is of such width and length that when moved into alignment with the handle the latter is freely attached or detached from the utensil in the usual manner, but when swung crosswise of the handle, the portions 22 and 22a of the lever engage the adjacent ends 11a, 11a of the lugs and secure the handle firmly in place in the socket. One end of the lever is preferably extended to form a handle for convenience in manipulation, as indicated at 23. In the form shown, the lever is made of a piece of substantially flat stock, having its handle 20 formed by twisting the longer end of the lever at right angles to the lug engaging portions 22 and 22a.

The pivot pin 21 is secured in the handle by suitable means, in the preferred form shown said pin being mounted for limited vertical yielding movement by means of a coil spring 25 fitting in an enlarged bore 26 at the bottom of the handle, and engages between the end shoulder 26a of said bore and a washer 27 riveted or similarly secured to the lower end of pin 21. This arrangement permits slight vertical yielding of the lever 20 as it is moved into and out of clamping engagement with the lugs 11, 11, which feature is particularly advantageous in affording ease of manipulation, and take-up for wear of the parts.

While I have illustrated and described the particular embodiment of my invention, it will be understood that I do not wish to be limited to the exact construction shown and described, but that various changes and modifications may be made without departing from the spirit and scope of my invention.

I claim:

In combination with a vessel having a tapered attaching socket member, a detachable handle provided with an end portion adapted to fit in the larger end of said socket member, a pivot pin yieldably mounted for limited longitudinal movement on said handle, and a lever on said pivot pin movable into and out of engagement with said socket member at its smaller end.

Signed at Chicago, Ill., this 9th day of January, 1929.

PERCY W. STEPHENS.